Patented Nov. 14, 1950

2,529,825

UNITED STATES PATENT OFFICE 2,529,825

PREPARATION OF CYCLIC 1,2-KETOLS HAVING 10 TO 18 CARBON ATOMS IN RING

Max Stoll, Geneva, Switzerland, assignor to Firmenich & Co., successeurs de la societe anonyme M. Naef & Cie., Geneva, Switzerland, a corporation of Switzerland No Drawing. Application December 6, 1946, Serial No. 714,650

8 Claims. (Cl. 260—586)

This invention relates to 10 to 18 membered cyclic 1,2 ketols and to a process for preparing them from lower aliphatic monohydric alcohol esters of open chain dicarboxylic acids having a chain length between and including the carboxylcarbons of 10 to 18 carbon atoms.

Since the discovery of acyloïnes by Bouveault & Locquin (Bull. Soc. Chim. de France (3) 35, 269-643 (1906)), the reaction leading to this class of substances has been the object of much research work. One part of this work deals with the mechanism of the reaction (Ber. deutsch. chem. Ges. 53, 388 (1920) Annalen d. Chemie 434, 265 (1923)), and had as a result the finding of new conditions for increasing yields. (J. Amer. Chem. Soc. 51, 3124 (1929) 52, 3988 (1930) 57, 2303 (1935)). Another part of the work relates to the application of the reaction to esters of various acids, in order to synthesize new substances. (Helv. Chim. Acta. 25, 604, 1086 (1942).)

The first attempt to apply the same reaction to esters of polymethylene-dicarboxylic acids for the production of polymeric and subsidiary cyclic acyloïnes is described in the U. S. Patent No. 2,228,268 filed in 1938. As regards the cyclic compounds, this patent claims a process of preparing cyclic acyloïnes having the following tautomeric structural formula:

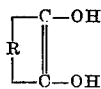

When R represents a chain of 12 to 14 carbons, these substances are said to have a pleasant odour. But the examplifications of the abovementioned patent report only two examples of cyclic tautomeric acyloïnes, namely those with R=8 and R=16 carbons, characterised respectively as a yellow liquid with a refractive index $n_D^{25}=1.4900$ and as a yellow wax, both having a pronounced camphoraceous, hence not interesting smell.

It is well known that cyclo-polymethylene alcohols such as civettol etc. have no interesting odour (Helv. Chim. Acta. 10, 696 (1927)); acyloïnes having the above structural formula of a bihydric unsaturated cyclo-polymethylene alcohol can therefore never be of any interest in the composition of perfumes.

In contradistinction to this it can now be asserted that acyloïnes having the structural formula of a cyclic 1,2- ketol

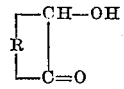

possess to a small degree the same odour as the corresponding cyclopolymethylene ketons, some of which are renowned for their fine musk-scent. The process claimed in the above-mentioned patent however, yields only undefined and rather impure mixtures of tautomeric acyloïnes, in which the presence of 1,2-ketols has not been proved.

It is an object of the present invention to provide a process for preparing those hitherto unknown 10 to 18 membered cyclic 1,2-ketols in a pure state. It is a further object of this invention to state important experimental conditions allowing to carry out the reaction with high yields. A third object is the preparation of new materials to be used for the synthetic preparation of perfume. Other objects will appear hereinafter.

The general method for preparing acyloïnes is that recorded in the J. Amer. Chem. Soc. 57, 2303 (1935). When applied to esters of open chains dicarboxylic acids, the reaction always results in a mixture of cyclic and linear polymeric acyloïnes. According to the method of preparing cyclic acyloïnes described in the U. S. Patent No. 2,228,268, the principal factor which determines the yield in cyclic acyloïnes as well as the composition of the cyclic compounds, is the ratio of solvent to ester reactants.

The present invention provides a process for making cyclic 1,2-ketols in which the principal factor determining the yield and structure of the cyclic compounds, is the ratio of oxygen, contained in the gases nitrogen, hydrogen, etc. in and over the solvent or sodium, to ester reactants during the whole reaction, including the decomposition reaction of sodium derivatives and the elimination of alkalinity. The less oxygen present, the higher the yield of 1,2-cycloketols will be and the less tautomeric and other by-product will be found. Table I may illustrate the overwhelming influence of small quantities of oxygen.

Regarding the quantity of solvent indicated in all the following tables, the first item indicates the quantity in which the sodium is dispersed and the second item the quantity in which the ester reactant is dissolved.

TABLE I

*Dimethylsebacate*

[Solvent: 1500+160 cc. abs. Xylol; Temp.: 140° C.; Chain-stirrer.]

| Carried out in an atmosphere of commercial nitrogen. 96% N₂ and 4% O₂. | Carried out in an atmosphere of nitrogen purified over Cu. 99.8% N₂ and 0.2% O₂. |
|---|---|
| 20 g. Na purified; 13.5 g. Dimethylsebacate. Introduction time 4.5 h.; Introduction speed 3 g./h. Yield: 18% B. P., 0.1 mm. 35-85° C.; yellow liquid. 17% polymeric residue; 60% polymeric acids. | 18 g. Na purified: 18 g. Dimethylsebacate. Introduction time 2.5 h.; Introduction speed 7.2 g./h. Yield: 52% B. P., 25 mm. 100-170°; crystallized product. 35% polymeric residue; 5% polymeric acids. |

In spite of a twice as high relative ester concentration (= half introduction speed) the operation carried out in an atmosphere of purified nitrogen yielded three times as much cyclic product as did the operation, carried out in an atmosphere of commercial nitrogen. Moreover, in the former case the cyclic product was cristallized and had therefore a well defined chemical structure. As will be shown in the examples below, this structure is that of a cyclic 1,2 ketol. Table II shows the still perceptible influence which the small quantities of oxygen, present in commercial nitrogen, exert during the decomposition phase of the sodium derivatives with alcohol when the reaction has been started with purified nitrogen.

TABLE II

*Dimethylester of 1,14-tetradecamethylene-dicarboxylic acid*

[Solvent: 1500+160 cc. Xylol absolute. Temp. 140° chain-stirrer 18 g. purified Na. 40 g. Ester. Introduction time 4 h.

| Commercial nitrogen during end-phase | Purified nitrogen during the whole reaction |
|---|---|
| Yield: 64%, B. P. 0.1 mm. 150–180° C. | Yield: 82%, B. P. 0.1 mm. 160–180° C. |

Table III gives a comparison between the yields and the structure of the cyclic products obtainable on the one hand by the process of the U. S. Patent No. 2,228,268 and, on the other, by the process claimed in the present application, both carried out in comparable relative concentrations.

TABLE III

| Dimethylester of hexadecamethylene dicarboxylic acid | Diethylester of tetradecamethylene dicarboxylic acid. |
|---|---|
| Process of U. S. Pat.No.2,228,268. | Process of present application. |
| 4 g. sodium, 350+520 g. Xylol; 25 g. ester; introd. time 1½ h. Monomeric cyclic acylomes; B. P. 214–220° C./6 mm. Yield: 44%. Yellow wax. | 6 g. sodium, 620+25 g. Xylol; 21 g. ester; introd. time 1 h. 7′. Cyclohexadecanolon-1,2; B. P. 152–154° C./0.1 mm. Yield 80% Crystallized; Melting point 52–56°. Recrystallized 58–59° C. |

Table IV shows that in the process according to the present invention, the influence of the relative ester concentration is almost negligible below a limit of about 13%.

This fact distinguishes the process claimed in the present application from all other cyclization reactions known to this day, including the reaction claimed in U. S. Patent No. 2,228,268.

TABLE IV

| Type of Ester | Ethylene-ketal of Diethyl-9-keto-1,17-heptadecanoate | Dimethylthapsiate | 1.18-Dimethyl-octadecanoate |
|---|---|---|---|
| Relative ester conc. g. ester/hours/ml. solvent. | 0.130 g./h./ml. | 0.030 g./h./ml. | 0.0037 g./h./ml. |
| Quantity of ester | 32.9 g. | 21 g. | 15.5 g. |
| Quantity of sodium | 8.5 g. | 6 g. | 13 g. |
| Quantity of solvent (Xylol abs.) | 580+70 cc. | 620+25 cc. | 1500+160 cc. |
| Introduction time | 23.5′ | 1 h. 6′ | 2, 5 h. |
| Yield cyclic prod., B. P. 0.1 mm | 82%, 190–200 (210) | 80%, 152–154 (160) | 78% (150)-170-180. |

Little diff. in residual oxygen contents have more influence on yield than relative concentration.

Contrary to the latter process claimed in U. S. Patent No. 2,228,268, the process according to the present invention seems to give better yields if the reaction is carried out not too slowly and in not too high dilutions. The new process is not limited to the esters of polymethylene dicarboxylic acids with 10 to 18 carbons. The acids may also be alkylated. In opposition to all other cyclization methods known hitherto (Helv. Chimica Acta 11, 689 (1928) 15, 1460 (1942)), the esters of these alkylated acids gave the expected cyclic 1,2-ketols, even when the alkylation occurred in the α-position.

Unsaturated esters are only suitable if the double bond is not placed in the α-β-position. In this case, the process leads to a reduction of the double bond.

Esters of keto-polymethylene dicarboxylic acids and hydroxy-polymethylene dicarboxylic acids are not suitable for the reaction in question. But their ketalized or etherified derivatives give as good yields of the corresponding cyclic 1,2-ketols as do the non-substituted acids.

This shows two more differences between the process claimed in the present application and the one claimed in the above cited U. S. Patent No. 2,228,268, in which unsaturated and keto acids are said to be suitable without distinction.

The methyl or ethyl esters of the following acids yield particularly interesting cyclic 1,2-ketols: tridecamethylene - 1,13 - dicarboxylic acid, tetradecamethylene-1,14-dicarboxylic acid, pentadecamethylene-1,15-dicarboxylic acid, 2-methyl-1,13-tridecane dicarboxylic acid, and the ethylenketal of the 8-oxo-pentadecane-1,15-dicarboxylic acid.

The stability of the cristallized cyclic 1,2-ketols is limited by a high sensibility towards oxygen. Storage therefore needs special precautions which consist in keeping the cyclic ketols, whether dissolved in an inert solvent, or melted and resolidified under a gas free of oxygen.

The more detailed practice of the invention is illustrated by the following examples. There are of course many forms of the invention other than these specific embodiments.

The process described for the preparation of the various cyclic 1,2-ketols is always the same, and is described at length in Example 1); in the other examples, only changes are stated.

EXAMPLE 1

5500–6000 ml. of xylol distilled over sodium are heated to about 140° C., after the air over the cold xylol has been replaced by dry absolute nitrogen. In order to eliminate all traces of water, 100 ml. of xylol are first distilled over in a small flask. The reaction vessel is then opened and 65.6 g. of pure sodium (4 mols + 3.5% excess) are added. Stirring is started. Series of plugs and valves connected with a source of dry and absolute nitrogen prevents the introduction of any trace of oxygen during the reaction. 266 g. nondiluted dimethylester of 8 - ketopentadecane - 1,15 - dicarboxylic acid, (Helv. Chimica Acta, 11, 504 (1928)), ketalized with ethylene glycol, are then added within 1 h. 30′ to the reflux of the boiling xylol. The reaction is exothermic and activates the boiling of the xylol. When all the ester has been introduced, the reaction mixture is cooled down to 20° C. 150 ml. ordinary alcohol are slowly added in such a manner that the reaction temperature does not rise above 30° C. The lower alkaline layer is separated and the remaining solution washed to neutrality. From this moment only the product may come in contact with the oxygen of the air. From the alkaline solutions, one can isolate 7.9 g. polymeric acids (=3.2% of the theoretical value). From the neutral solutions, the solvent is distilled. The remaining neutral residue weighs 213 g. (=94.7% of the theoretical value). A high vacuum distillation gives 190 g. of cyclic products (B. P. 0.1 mm. 190–200–210° C.) which cristallize entirely after a few days. The yield is 83% of the theoretical amount. Cristallization in sulfuric ether or methanol at −80° C. to −20° C. gives a well cristallized product, melting at 48.5–50° C. (yield 95%), and having the following physical constants:

$$d_4^{55}=1.036 \qquad n_D^{60}=1.4822$$

By a treatment with alcoholic hydrochloric acid, the cyclo-10-keto-heptadecanol-1-one-2 is regenerated and gives with 3,5-dinitrobenzoyl-chlorid a mono-3,5-dinitrobenzoate, melting at 106–107° C. and having the formula

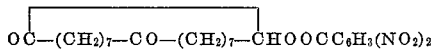

$$O\overset{\lceil}{C}-(CH_2)_7-CO-(CH_2)_7-\overset{\rceil}{C}HOOCC_6H_3(NO_2)_2$$

EXAMPLE 2

129 g. of diethylester of sebacic acid were treated with 48.3 g. of sodium during 2 hours 48′ in the same manner and in the same quantity of solvent as described in Example 1. The reaction gave 60.16 g. (or 70.8% of the theoretical value) of cyclic products. 39.5 g. or 46.5% distilled under 10 mm. pression at (120)–124–127° C., and cristallized entirely after cooling. Recristallized, the pure cyclo-decanol-1-one-2 melted at 38–39° C. The corresponding oxime melted at 99–100° C.

EXAMPLE 3

142.9 g. of diethylester of brassylic acid were treated as described in Example 1 and yielded 96.7 g. (or 93.7%) of neutral products from which 70.8 g. (or 68.7% of the theoretical value), distilled at 120–126–(139°) C./0.2–0.3 mm. and cristallized after cooling. Recristallized, the pure cyclo-tridecanol-1-one-2 melted at 45–46° C. and had the following physical constants:

$$n_D^{55}=1.4786 \qquad d_4^{55}=0.9840$$

Molecular refraction $MR_D$ calculated for

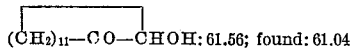

$$(\overset{\lceil}{C}H_2)_{11}-CO-\overset{\rceil}{C}HOH: 61.56;\ found: 61.04$$

The corresponding oxime melted at 98–99° C.

EXAMPLE 4

409 g. of diethylester of tridecamethylene-1,13-dicarboxylic acid were treated as described in Example 1 and yielded 264.7 g. of neutral reaction products of which 236 g. (79% of the theoretical value) distilled at 123–139° C./0.02 mm. and cristallized entirely after cooling.

Recristallized, the cyclopentadecanol-1-one-2 melted at 57–58° C. and had the following physical constants:

$$n_D^{55}=1.4765 \qquad d_4^{55}=0.9632$$

Molecular refraction $MR_D$ calculated for the formula

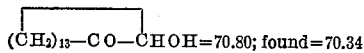

$$(\overset{\lceil}{C}H_2)_{13}-CO-\overset{\rceil}{C}HOH=70.80;\ found=70.34$$

The product has a distinct musky odour. The cyclo-pentadecanol-1-one-2-oxime melts at 110–110.5° C.

EXAMPLE 5

206.9 g. of diethyl thapsiate were treated as described in Example 1 and yielded 146.17 g. of neutral products from which 120.2 g. (78.2% of the theoretical yield) distilled at 152–154°–(162°) C./0.12 mm. The product cristallized entirely and melted roughly at 52–56° C. Recrystallized, it melted at 58–59° C. The cyclo-hexadecanol-1-one-2 had a slight musky odour.

EXAMPLE 6

102.2 g. of diethylester of 1-methyl, 1,13-pentadecanedicarboxylic acid (Helvetica Chimica Acta 10, 180 (1927)) were heated as mentioned in Example 1 and yielded 69.3 g. of neutral products from which 44.4 g. (58.5% of the theoretical yield) distilled at 146–149° C./0.8 mm. This product does not cristallize at ordinary temperature, but molecular refraction shows that it is a 1,2-ketol and not an unsaturated glycol. It has the following physical constants:

$$n_D^{17.7}=1.4874 \qquad d_4^{17.5}=0.9743$$

(Molecular refraction $MR_D$ calculated: for 3-(or 15-) methyl-cyclopentadecanol-1-one-2=75,42, for 3-methyl-cyclopentadecene-1-diol-1,2=76.47; found 75.02. The product has a pronounced musk-like odour.

Among other products prepared by this method were: cyclo-heptadecanol-1-one-2, melting point 55–56° C., melting point of the oxyme 121–122° C.; cyclo-octadecanol-1-one, melting point 59–60°; a mixture of 4-methyl-cyclopentadecanol-1-one-2 and 14-methyl-cyclopentadecanol-1-one-2, which is liquid at ordinary temperature.

What I claim is:

1. Process for preparing a solid crystalline cyclic 1,2-ketol, having 10 to 18 carbon atoms in the cycle, crystallizable to a substantially pure white solid crystalline product having a definite melting point by internal condensation of a lower monohydric aliphatic alcohol ester of an open chain dicarboxylic acid having a chain length including the carboxyl-carbons of 10 to 18 carbon atoms, comprising reacting in an apparatus from which all oxygen has been displaced by a boiling solvent and a substantially oxygen free inert gas, by slowly adding the open chain ester in said continuously maintained inert atmosphere to a mixture of melted and finely divided alkali metal with a dry low boiling inert solvent while thoroughly stirring and refluxing the same, decomposing the metallic derivative formed, neutralizing and washing all in a similarly oxygen free inert atmosphere and maintaining the weight ratio of the total quantity of oxygen present in the reaction mixture during the entire operation to the total quantity of ester reactant less than the limit of 1:1000.

2. Process as defined in claim 1, wherein the ratio of total oxygen to ester reactant is kept below the limit 1:1000 by using the smallest possible quantity of nitrogen which has been substantially freed of the oxygen normally contained as impurity therein in a very tight apparatus and by reducing the reaction time to the shortest limit allowed by the monomolecular reaction velocity.

3. Process as defined in claim 1, wherein the inert atmosphere is absolute nitrogen containing less than .2% of oxygen derived by passing commercial nitrogen normally containing about 4% of oxygen over hot copper.

4. Process as defined in claim 1, wherein the solvent is dry xylol.

5. Process as defined in claim 1 wherein the ketol is a cyclic 1,2 ketol unsaturated in a position other than in the alpha-beta position prepared from a monohydric open chain unsaturated aliphatic alcoholic ester having a chain length including the carboxylic carbons of 10–18 carbon atoms.

6. Process as defined in claim 1, wherein the ketol is a mono-ketalized derivative of a cyclic 10 to 18 carbon atom keto 1,2-ketol prepared from a monohydric aliphatic alcohol ester of a ketalized open chain keto-dicarboxylic acid having a chain length between and including the carboxyl carbons of 10 to 18 carbon atoms.

7. Process for preparing a solid crystalline cyclic 1,2-ketol, having 10 to 18 carbon atoms in the cycle, crystallizable to a substantially pure white solid crystalline product having a definite melting point by internal condensation of a lower monohydric aliphatic alcohol ester of an open chain dicarboxylic acid having a chain length including the carboxyl-carbons of 10 to 18 carbon atoms, comprising reacting in an apparatus from which all oxygen has been displaced by an absolute inert gas substantially free of oxygen, said inert gas being first treated to remove oxygen, said an oxygen content of less than .2%, by slowly adding the open chain ester in said continuously maintained inert atmosphere to a mixture of melted and finely divided alkali metal with a dry low boiling inert solvent while thoroughly stirring and refluxing the same and decomposing the metallic derivative formed, neutralizing and washing all in a similarly inert atmosphere.

8. Process for preparing a cyclic, 1,2-ketol having 10 to 18 carbon atoms in the cycle of crystalline solid character by internal condensation of a lower monohydric aliphatic olcohol ester of an open chain dicarboxylic acid having a chain length including the carboxyl carbons of 10 to 18 carbon atoms, comprising forming an absolute inert gas comprising nitrogen having less than .2% oxygen therein by passing the commercially inert nitrogen gas over hot copper to reduce the oxygen content to less than .2%, suspending finely divided alkali metal in a low boiling inert solvent in a closed reaction vessel, flushing the atmosphere above said metal suspension in the solvent in said reaction vessel with said purified absolute inert nitrogen gas and continuously maintaining said inert atmosphere above the reaction mixture during the reaction with a minimum quantity of gas, heating said alkali metal suspension in a solvent to reflux with rapid agitation and slowly adding thereto said open chain di-carboxylic acid ester, decomposing the metallic derivative formed by washing the reaction mixture to neutrality in a similarly inert nitrogen atmosphere and distilling the solvent therefrom in a similarly inert atmosphere to obtain the crystalline solid cyclic 1,2-ketol having 10 to 18 carbon atoms recrystallizable to a pure white crystalline solid having a definite melting point.

MAX STOLL.

REFERENCES CITED

The following references are of record in the file of this patent:

UNITED STATES PATENTS

| Number | Name | Date |
|---|---|---|
| 2,228,268 | Hansley | Jan. 14, 1941 |

OTHER REFERENCES

Hansley, J. Am. Chem. Soc., vol. 57, pages 2303–2305 (1935).